Oct. 18, 1960  A. BELL  2,956,433
PRESSURE SEALING MEANS FOR LIQUID LEVEL GAGES
Filed Jan. 31, 1956

INVENTOR.
ALAN BELL
BY
ATTORNEY

United States Patent Office 2,956,433
Patented Oct. 18, 1960

2,956,433

PRESSURE SEALING MEANS FOR LIQUID LEVEL GAGES

Alan Bell, Sutton Courtenay, England, assignor to Foster Wheeler Corporation, New York, N.Y., a corporation of New York Filed Jan. 31, 1956, Ser. No. 562,549

7 Claims. (Cl. 73—325)

This invention relates to liquid level gages and more particularly to protective fluid seals for liquid level gages which indicate the level of liquids under relatively high pressures.

Generally, liquid level gages for high pressure vessels are mounted outside of the latter as to be subjected to atmospheric pressure conditions whereby the differential pressure across the gage is large enough to present the problem of leakage. Such problem normally merits consideration because it affects the accuracy of the gage, but even greater consideration is warranted when the vessel contains a noxious liquid. In such event, escape of the liquid into the atmosphere creates a dangerous condition to operating personnel in the surrounding area. The foregoing hazardous condition may also arise due to the exposed position of the gage outside the vessel, as for example where it is struck accidentally and leakage results.

To obviate the possibility of liquid leakage, it has been proposed to construct liquid level gage assemblies of extra heavy gage material to withstand the differential pressures to which the assemblies are subjected and to withstand accidental shocks. However, this expedient is unsatisfactory because it is relatively expensive and does not solve the problem of leakage of liquid into the atmosphere.

Accordingly, it is an object of this invention to provide a simple and compact protective fluid seal which obviates liquid leakage from liquid level gage assemblies.

In accordance with the present invention, a casing or housing is disposed to encompass a liquid level gage assembly supported on the external surface of a high pressure vessel and in communication with the interior of the vessel. The casing is secured to the wall of the vessel in a fluid tight manner and is provided with an inlet opening which communicates with a source of fluid to maintain the casing under a pressure substantially equal to that of the pressure of the liquid within the vessel. The casing also is provided with an outlet which communicates with a leak detecting and indicating instrument so that if liquid leakage does occur, an operator is informed of the same.

Figure 1:
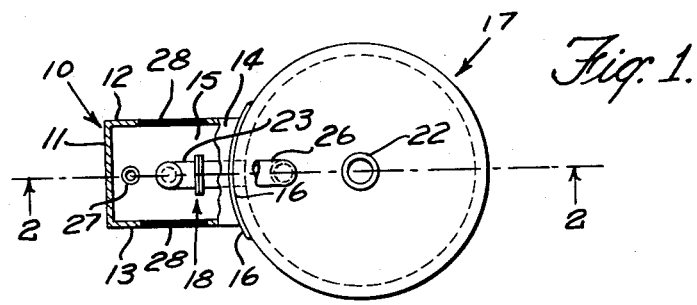
Figure 2:
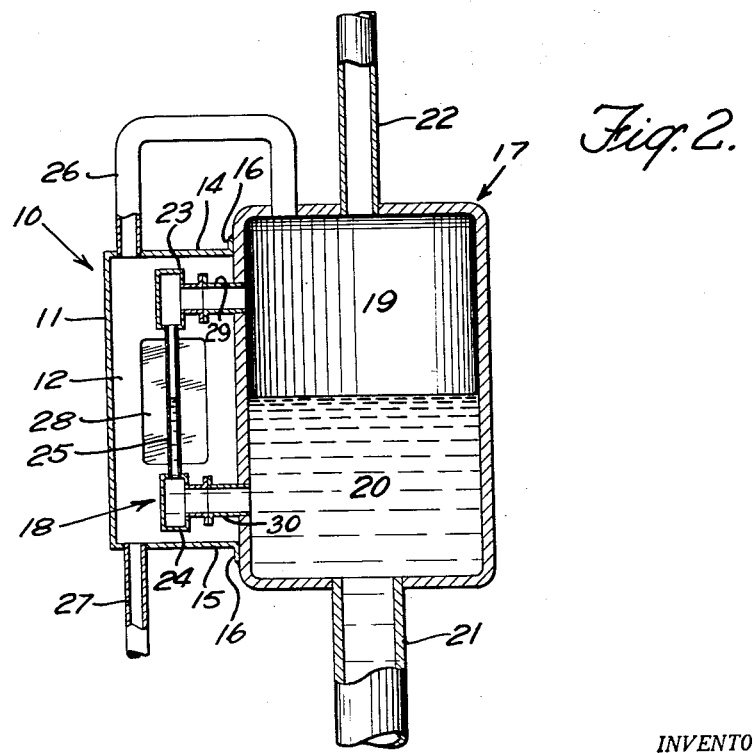

The invention will be more fully understood from the following detailed description thereof when considered with the accompanying drawing in which:

Fig. 1 is a top plan view of an arrangement constituting an embodiment of the present invention; and Fig. 2 is a view in vertical section taken along line 2—2 of Fig. 1.

The present invention is applicable, among other things, to heat exchange systems in which a liquid, as for example a liquid metal such as sodium or liquid sodium-potassium alloy, as used as a heat exchange medium and is maintained under pressure by a gaseous fluid, as for example an inert gas such as nitrogen or argon, the latter being also supplied to a header tank which permits changes in liquid volume due to temperature changes. To illustrate an application of the present invention, the latter will be disclosed hereinafter with reference to a header tank in the above mentioned heat exchange system.

Referring now to the drawing, 10 generally designates a casing comprising three contiguous vertical walls 11, 12 and 13, an upper wall 14 and a lower wall 15; the walls being joined together, along their adjacent ends, in a fluid tight manner. Adjacent edges of the walls 12, 13, 14 and 15 are provided with outwardly extending flanges 16. Casing 10 is secured, at flanges 16, to a high pressure vessel or header tank 17 in a fluid tight manner by welding or by other suitable means, and is so positioned as to encompass a liquid level gage assembly 18 which is mounted on vessel 17. Casing 10, including that portion of the vessel wall to which the casing is secured, forms a fluid tight enclosure surrounding liquid level gage assembly 18.

Vessel 17 has a gas space 19 in the upper part thereof and a liquid space 20 in the lower portion of the tank. Liquid, as for example, liquid sodium or liquid sodium-potassium alloy, is supplied to liquid space 20 of vessel 17 by a conduit 21 which is connected at one end to the bottom of vessel 17 and at the opposite end to a source of liquid (not shown), as for example, a heat exchange apparatus in a heat exchange system (not shown). A conduit 22 is connected at one end to the top of vessel 17 and at the opposite end to a source of inert fluid (not shown) as for example neon, argon or nitrogen, to supply vapor space 19 with a fluid under pressure.

Liquid level gage assembly 18 comprises an upper pipe fitting 23 and a lower pipe fitting 24 which are connected to nipples 29 and 30, respectively. Nipples 29 and 30 are secured at their opposite ends to vessel 17 and communicate with vapor space 19 and liquid space 20, respectively, of vessel 17. A transparent tubular member 25, as for example a glass tube, is connected at its opposite ends to pipe fittings 23 and 24. Since upper pipe fitting 23 communicates with lower pipe fitting 24 through transparent tubular member 25 and pipe fittings 23 and 24 communicate with vapor space 19 and liquid space 20, respectively, of vessel 17, through nipples 29 and 30, respectively, the liquid level in vessel 17 is indicated by the level of the liquid in tubular member 25.

A conduit 26 is connected at one end to upper wall 14 of casing 10 and at the other end to a source of inert fluid, as for example gas space 19, to provide a pressure in casing 10 substantially equal to the pressure of the liquid within vessel 17, whereby liquid level gage assembly 18 is not subject to an appreciable pressure differential. It is to be understood, however, that conduit 26 need not be connected to gas space 19 but to any source of inert fluid which provides the required pressure. A conduit 27 is connected at one end to lower wall 15 of casing 10 and at the opposite end to a liquid leak detecting and indicating instrument (not shown) for detecting and indicating the presence of liquid in the casing.

Opposite walls 12 and 13 of casing 10 are each provided with a transparent window 28, through which windows, transparent tubular member 25 is observable from outside casing 10. Windows 28 extend substantially the length of transparent tubular member 25 and are secured in walls 12 and 13 in a fluid tight manner. Windows 28 are of sufficient thickness to withstand the pressure to which the interior of casing 10 is subjected.

In use, the casing is supplied with a fluid through conduit 26 at a pressure substantially equal to the pressure of the liquid in liquid level gage assembly 18. In the event of liquid leaking from liquid level gage assembly 18, the liquid leakage is contained by casing 10 and passes through conduit 27 to the leak detecting and indicating instrument (not shown).

It can be readily seen, from the foregoing disclosure, that a fluid pressurized casing has been provided for a liquid level gage assembly, which assembly is employed to indicate the level of a liquid held under relatively high pressures, whereby the possibility of liquid leakage from the liquid level gage assembly is minimized without constructing the latter of extra heavy gage material. The casing also serves to contain liquid leakage, if liquid leakage from the liquid level gage assembly occurs, and to protect the liquid level gage assembly from damage due to accidental shocks.

Although the invention has been illustrated and described in detail, it is to be expressly understood that the invention is not limited thereto. Various changes can be made in the arrangement of parts without departing from the scope of the invention, as the same will now be understood by those skilled in the art.

What is claimed is:

1. In combination, a vessel having a liquid space containing a noxious liquid and a gas space which accommodates an inert gas under pressure for maintaining liquid in the liquid space under a predetermined pressure, a liquid level gage, a first connecting means secured to said vessel to communicate with the gas space to receive gas from the latter and secured to the liquid level gage to deliver gas thereto, a second connecting means secured to said vessel to communicate with the liquid space of said vessel to receive liquid from the latter and secured to said liquid level gage to deliver said liquid thereto, a housing enclosing the gage and said first and second means to render the gage and said first and second means fluid tight with respect to ambient atmospheric pressures, and means in communication with the interior of said housing for supplying an inert gas having a pressure value substantially equal to the pressure of the liquid in said vessel to effect a negligible pressure differential across said gage and said first and second connecting means.

2. The combination set forth in claim 1 wherein said housing includes discharge means for conducting liquid from said housing in the event of liquid leakage from said gage and th efirst and second connecting means to effect detection and indication of liquid in said housing.

3. In combination, a vessel having a lower liquid space containing a noxious liquid and an upper gas space which accommodates an inert gas under pressure for maintaining the liquid in the liquid space under a predetermined pressure, a vertically disposed liquid level gage, said gage being hollow and constructed of non-opaque material, a first connecting means secured at one end to said vessel and at the opposite end to the top of said liquid level gage to communicate the vapor space of said vessel with the interior of said liquid level gage, a second connecting means secured at one end to said vessel and at the opposite end to the bottom of said liquid level gage to communicate the interior of said liquid level gage with the liquid space of said vessel, a housing dimensioned to enclose the liquid level gage and said first and second connecting means in a fluid-tight manner to render the liquid level gage and said first and second connecting means fluid tight with respect to ambient atmospheric pressures, and means in communication with the interior of said housing for supplying an inert gas having a pressure value substantially equal to the pressure of the liquid in said vessel to effect a negligible pressure differential across said gage and said first and second connecting means.

4. The combination set forth in claim 3 wherein said housing is provided with means for rendering the gage accessible visually from outside of the housing.

5. In combination, a vessel having a lower liquid space containing a noxious liquid and an upper gas space which accommodates an inert gas under pressure for maintaining the liquid in the liquid space under a predetermined pressure, a vertically disposed liquid level gage, said gage being hollow and constructed of non-opaque material, an upper and lower pipe fitting respectively, secured to the upper and lower end of said liquid level gage, a connecting pipe secured at one end to said upper pipe fitting and at the opposite end to the vessel to communicate the gas space of said vessel with the interior of the liquid level gage, another connecting pipe at one end to said lower pipe fitting and at the opposite end to the vessel to communicate the liquid space of said vessel with the interior of the liquid level gage, a housing enclosing said liquid level gage and said upper and lower pipe fittings and the connecting pipes and secured to said vessel to render the liquid level gage, pipe fitting and connecting pipes fluid tight with respect to ambient atmospheric pressures, means in communication with the interior of said housing for supplying an inert gas having a pressure value substantially equal to the pressure of the liquid in said vessel to effect a negligible pressure differential across said gage and said first and second connecting means.

6. In the combination set forth in claim 5, wherein said inert gas supply means communicates with the interior of said housing and the gas space of said vessel to supply the interior of said housing with inert gas from the latter to effect a negligible pressure differential across said gage and said first and second connecting means.

7. In combination, a vessel having a lower liquid space containing a noxious liquid and an upper gas space which accommodates an inert gas under pressure for maintaining the liquid in the liquid space under a predetermined pressure, a vertically disposed liquid level gage, said gage being hollow and constructed of non-opaque material, a first connecting means secured at one end to said vessel and at the oppoiste end to the top of said liquid level gage to communicate the vapor space of said vessel with the interior of said liquid level gage, a second connecting means secured at one end to said vessel and at the opposite end to the bottom of said liquid level gage to communicate the interior of said liquid level gage with the liquid space of said vessel, a casing having one side open and dimensioned to enclose said liquid level gage and said first and second connecting means, said casing disposed with the open side thereof against said vessel and secured thereto along said open side in a fluid-tight manner to render said gage and said first and second connecting means fluid tight with respect to ambient atmospheric pressures, and means in communication with the interior of said housing for supplying an inert gas having a pressure value substantially equal to the pressure of the liquid in said vessel to effect a negligible pressure differential across said gage and said first and second connecting means.

References Cited in the file of this patent

UNITED STATES PATENTS

| 1,044,621 | Zindel | Nov. 19, 1912 |
| 1,406,926 | Bryan | Feb. 14, 1922 |
| 1,573,834 | Holmes | Feb. 23, 1926 |
| 2,455,200 | Wallace | Nov. 30, 1948 |

FOREIGN PATENTS

| 964,092 | France | Jan. 18, 1950 |